Nov. 24, 1931.  F. D. CHANDLER  1,833,825
MOLD WIPER FOR TYPOGRAPHICAL MACHINES
Filed Sept. 13, 1930
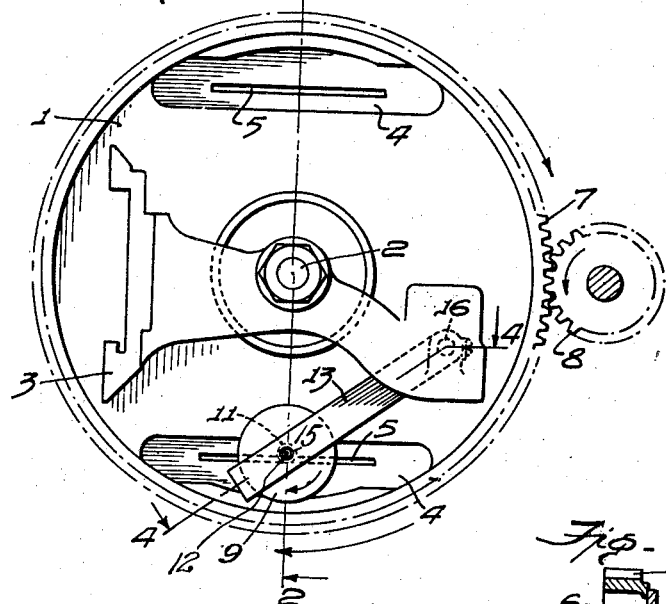
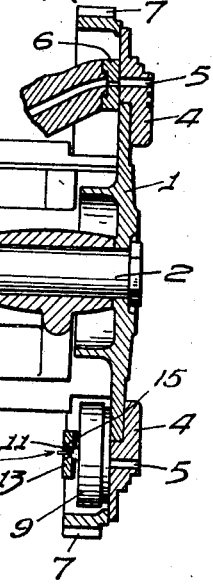
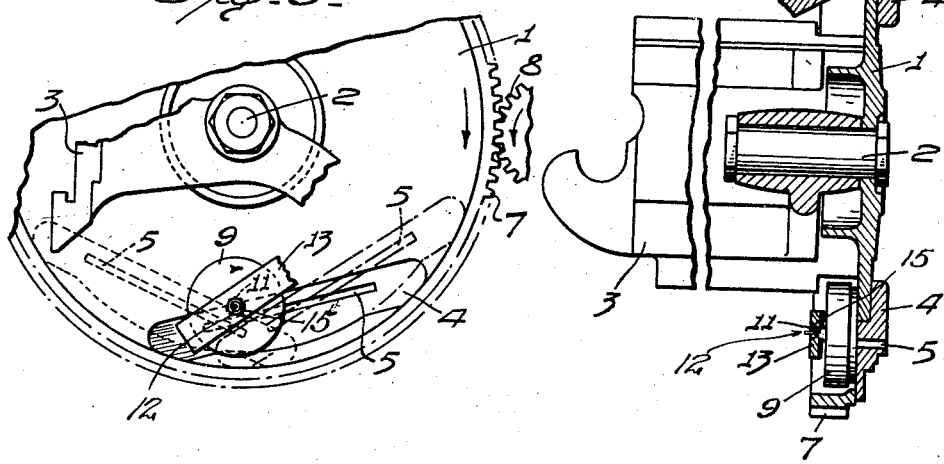
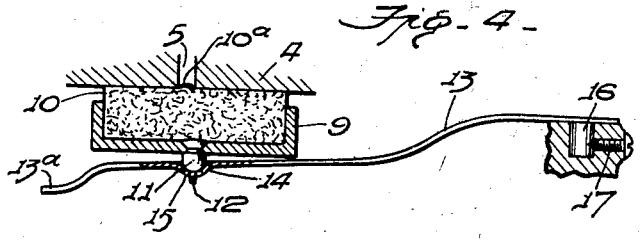
FRANK D. CHANDLER
INVENTOR
BY
ATTORNEY Patented Nov. 24, 1931

1,833,825

UNITED STATES PATENT OFFICE

FRANK DAVENPORT CHANDLER, OF NEW HYDE PARK, NEW YORK, ASSIGNOR TO INTERTYPE CORPORATION, OF BROOKLYN, NEW YORK, A CORPORATION OF NEW YORK

MOLD WIPER FOR TYPOGRAPHICAL MACHINES

Application filed September 13, 1930. Serial No. 481,759.

The present invention relates to improvements in typographical machines and more especially to those of the general class shown and described in Letters Patent No. 436,532, granted September 16, 1890 to O. Mergenthaler, wherein lines of matrices are presented to the front of a mold or molds carried by a rotatable mold wheel and the mouth piece of a metal pot is brought against the rear face of the mold to force molten metal therein to cast type bars or slugs from such matrix lines.

In the operation of machines of this class, it has been found necessary to employ wipers to wipe the front and rear faces of the mold in order to keep these surfaces clear of particles of type metal which are deposited thereon and, if permitted to remain, would accumulate and preclude the metal-tight joint or seal required between these surfaces and the matrix line and metal pot mouth piece, but the wipers heretofore employed have the disadvantage of wearing unevenly due to the rotation of the mold wheel always in the same direction, thus prematurely impairing their wiping efficiency and rendering them unfit for further use, and such uneven wear of the wipers heretofore used has been aggravated unless the pressure applied thereto is applied exactly perpendicularly to the mold surfaces.

The object of the present invention is to obviate the objections inherent in mold wipers as heretofore employed and to provide a novel and improved wiper which will wear uniformly and maintain its wiping efficiency for a longer period of time, it providing a mold wiper which is self-alining so that it will act against the mold surface with substantially uniform pressure throughout its area and hence will thoroughly wipe all portions of the mold surface with which it cooperates, and which will revolve or change its position incident to rotation of the mold wheel so that all portions of its wiping surface will be brought successively into action, and, in consequence, wear of the wiper will be distributed equally over its wiping surface so that the wiper will wear evenly.

To these and other ends the invention consists in certain improvements and combinations and arrangements of parts all as will be hereinafter more fully described, the features of novelty being pointed out particularly in the claims at the end of this specification.

In the accompanying drawings:—

Fig. 1 is a rear elevation of a mold wheel and its slide, equipped with a mold wiper embodying the present invention;

Fig. 2 is a section taken on the line 2—2 of Fig. 1;

Fig. 3 is a rear elevation of a portion of the mold wheel and the wiper shown in Fig. 1, illustrating diagrammatically the manner in which the mold acts on the wiper to rotate it; and Fig. 4 is an enlarged sectional view taken on the line 4—4 of Fig. 1, showing the wiper and the cooperating mold in section and illustrating the contacting relationship of the mold and wiper.

Similar parts are designated by the same reference characters in the different figures.

The improved wiper is shown in the present instance applied to the mold wheel and molds of a typographical machine of the general class shown and described in the Mergenthaler patent hereinbefore referred to, 1 designating the mold wheel which is commonly supported by a pivot 2 so that it may rotate on a mold slide 3, the latter being commonly mounted in the machine so that it may slide forwardly and rearwardly, the mold wheel carrying one or more molds 4 each having a slot-like cavity 5 therein in which the body of a type bar or slug is cast, the forward face of the mold in use being brought into engagement with a line of matrices which may be composed in the machine in the usual way, the front face of the mold being accurately finished to exactly fit against and form a metal-tight joint with the rear side of the matrix line, and the rear face of each mold being flush with the rear face of the mold wheel and being accurately finished to form a metal-tight joint or seal with the mouth-piece 6 of a metal pot which serves to force molten metal into the mold cavity to cast a type bar or slug therein, the forward edge of which contains characters which are reproductions of those borne by the matrices composing the matrix line. Normally, as is usual in machines of this class, the mold wheel occupies a rearwardly retracted position relatively to the position occupied by the matrix line and the metal pot and its mouth-piece occupies a rearwardly retracted position relatively to the mold wheel, the mold wheel being moved forwardly to bring the mold thereon which is in use into engagement with the matrix line to form a metal-tight joint or seal therewith and the mouth-piece of the metal pot is moved forwardly to form a metal-tight joint or seal with the rear face of the mold, after which the metal pot operates to inject molten metal into the mold to cast the type bar or slug, and after the casting operation has been thus performed, the metal pot and its mouth-piece are retracted rearwardly from the mold and the mold wheel and mold are retracted rearwardly from the matrix line, and the mold wheel is thereupon rotated in the direction indicated by the arrows in Fig. 1 to remove the mold containing the type bar or slug from casting position and to carry the type bar or slug past a trimming knife into ejecting position where the type bar or slug is removed from the mold, following which, the mold wheel continues its rotation to bring the mold in use into casting position, ready for the performance of another casting operation. Rotation of the mold wheel is usually effected by gear teeth 7 which extend around the circumference thereof and mesh with a pinion 8, the latter being revolved at the proper times by mechanism contained in the machine, as is well known in the art.

The mold wiper performs its wiping action upon the mold after a type bar or slug has been cast therein and while the mold is rotating to carry the mold from the casting position to the ejecting position. The improved mold wiper shown in the present instance comprises a cup-like holder 9 which may be composed of metal or other suitable material, it being preferably round and having a closed rear wall and a surrounding circular flange, forming a pocket to contain the wiping medium 10 which may be composed of felt, leather or other suitable relatively yieldable wiping material, the wiping medium being preferably in the form of a pad which is pressed or otherwise retained in the cup-like holder and the cup-like holder is sufficiently shallow to allow the wiping medium or pad to extend beyond its flange or rim and to contact with the surface of the mold to be wiped, the mold engaging face of the wiping medium or pad being flat to conform with such surface of the mold. The cup-like holder 9 is provided with a stud 11 which projects from the center of its closed wall behind the wiping medium, this stud being for example riveted to such wall, as shown, and the outer end of this stud is rounded or spherical to form a rocker and pivotal bearing surface and is provided with a reduced centrally projecting pin 12. The mold wiper is supported in proper position in relation to the mold wheel and is pressed with the proper pressure against the mold wheel to cooperate with the mold or molds thereon by a resilient arm 13 composed of flat spring steel or other suitable material, this arm having a rounded or spherical depression 14 near its free end to form a socket in which the rounded or spherical outer end of the stud 11 may seat and rock freely in any direction and also rotate about the stud 11 as an axis, and a hole 15 extends through the center of the depression 14 so that the pin 12 on the stud 11 may project loosely therethrough, the pin 12 confined in the hole 15 preventing disengagement of the wiper from the arm 13. The resilient arm 13 carrying the wiper is fixed to a suitable part of the machine adjacent to the mold wheel so as to position the face of the wiper so that it will contact with the face of the mold which is to be wiped as the mold wheel rotates, the wiper being shown in the present instance as applied to the rear side of the mold wheel to wipe the rear face of the mold and the arm 13 having a stud 16 fixed thereon and held rigidly by a set screw 17 in a portion of the mold wheel slide 3. The wiper supporting arm 13 is so mounted that the pivotal center of the wiping medium, defined by the stud 11 and pin 12 will be at one side of the path of the mold slot or cavity 5 as the latter is carried past the wiper by rotation of the mold wheel, this pivotal center being shown in the present instance as above or toward the inner side of the circular path of the mold cavity. The free end of the arm 13 preferably projects beyond the wiper to form a handle 13ª by means of which said arm may be retracted to release the stud 11 from the depression 14 and thus permit removal of the wiper when desired. Since the stud 11 is held in place in the depression 14 mainly by the pressure of the arm 13 and is free to rock therein, it may be displaced from such depression should the wiper encounter any obstruction such as squirt-metal accumulations on the rear face of the mold wheel, thereby avoiding damage to the wiper which would be likely to occur if the parts were not thus free to yield.

The resilient arm 13 is of such strength that it will force the wiping material 10 in the cap-like holder 9 firmly against the back of the mold disk and to an extent that will cause the portion of the relatively soft wiping material opposite the mold slot or cavity 5 to expand slightly, under the pressure of the spring arm 13, into the mole slot or cavity as the latter passes the wiper, as indicated at 10ª in Fig. 4, and such expansion of the wiping medium into the mold cavity will produce a gripping action between the edges of the mold cavity and the wiping medium and will cause the wiper to rotate about the stud 11 as an axis as the mold passes the wiper, the wiper being rotated in the direction indicated by the arrow in Fig. 3, due to the gripping of the portion of the wiper below its pivotal center with the slot or cavity in the passing mold, which applies a greater rotating force to the wiper than is applied to the portion thereof which is above its pivotal center and which bears on the smooth surfaces of the mold and mold wheel.

The rotation thus imparted to the wiper each time a mold passes it brings different portions of the mold engaging surface of the wiping material into action, thereby distributing the wear uniformly over the entire surface of the wiping medium so that the wiping medium will wear evenly, and the uniform distribution of the wear on the wiping medium is further assisted by the universal bearing engagement of the stud 11 on the wiper in the rounded socket or depression 14 in the arm 13, this connection between the arm 13 and the wiper enabling the wiper to aline itself so that the wiper surface will lie flat against the mold surface to be wiped and will bear against said surface with uniform pressure throughout the contact surface of the wiper.

By providing the ball and socket or universal bearing between the wiper and its resilient pressure-applying arm, the mold engaging face of the relatively soft wiping pad or medium is pressed against the face of the mold wheel and the mold or molds thereon by a force which acts perpendicularly to said face and the wiper is free to rock in any plane transverse to said face so that it is self-alining and its mold-wiping face will bear uniformly or with equal pressure throughout its area against said face, thus insuring thorough wiping of the mold face and promoting uniform wear of the wiper, any by mounting the wiper for rotation about an axis perpendicular to the face of the mold wheel and mold or parallel to the axis of the mold wheel and at one side of the path in which the mold slot or cavity travels during rotation of the mold wheel, the protruding of the relatively soft material of the wiper into such slot or cavity in the mold under the pressure applied to the wiper causes the wiper to rotate on said axis each time a mold passes the wiper, thereby changing the engaging position of the wiper with the mold with sufficient frequency to distribute the wear of the wiper substantially uniformly throughout its area, thereby insuring even wear thereof and maintaining the efficiency of its wiping action.

I claim as my invention:—

1. A mold wiper for typographical machines comprising a holder carrying a wiping medium having a mold-wiping face, a support, and a pivot bearing directly behind the center of the wiping face of the wiping medium and connecting said holder to said support for applying pressure to said holder and about which bearing the holder may rock and rotate.

2. A mold wiper for typographical machines comprising a holder carrying a wiping medium having a mold-wiping face, a support, and a ball-and-socket bearing connecting said holder to said support and about which the holder may rock universally and also rotate.

3. A mold wiper for typographical machines comprising a holder carrying a wiping medium having a mold-wiping face, a support, the holder and support being connected to permit relative rocking and rotative movements by a stud carried by one of said parts having a ball-like bearing portion and a depression on the other part to rockably and removably receive said ball-like bearing portion of the stud.

4. A wiper for the slotted mold carried by the rotatable mold wheel of a typographical machine comprising a wiping member having a relatively yielding wiping face, and means engaging said wiping member directly behind the center of its wiping face for pressing its wiping face against the mold during rotation of the mold wheel and supporting the wiping member for rotation on an axis located at one side of the path of the slot in the mold.

5. In a typographical machine having a rotatable mold wheel carrying a mold having a slug casting cavity therein, a mold wiper having a relatively yielding mold-wiping face, and a bearing engaging the wiper directly behind the center of its wiping face for holding the wiper in position against the mold wheel and a face of the mold and for supporting the wiper for rotation on an axis located at one side of the path of the mold cavity.

6. In a typographical machine having a rotatable mold wheel carrying a mold having a slug casting cavity therein, a mold wiper having a relatively yielding mold-wiping face, and means engaging the wiper directly behind the center of its wiping face for pressing the wiper against the mold wheel and a face of the mold during rotation of the mold wheel and for supporting the wiper to rock freely transversely of the plane of the mold face and to rotate on an axis substantially parallel to that of the mold wheel and located at one side of the path of the mold cavity.

In testimony whereof I have hereunto set my hand.

FRANK DAVENPORT CHANDLER.